(12) United States Patent
Timken

(10) Patent No.: US 6,872,685 B2
(45) Date of Patent: Mar. 29, 2005

(54) METHOD FOR PREPARING A HIGHLY HOMOGENEOUS AMORPHOUS SILICA-ALUMINA COMPOSITION

(75) Inventor: Hye Kyung C. Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/291,114

(22) Filed: Nov. 8, 2002

(65) Prior Publication Data

US 2004/0092390 A1 May 13, 2004

(51) Int. Cl.$^7$ ............................................... B01J 21/00
(52) U.S. Cl. ........................................................ 502/263
(58) Field of Search ............................ 502/2, 263, 243, 502/250

(56) References Cited

U.S. PATENT DOCUMENTS

| | | | |
|---|---|---|---|
| 3,664,971 A | * 5/1972 | Jaffe | 502/84 |
| 3,664,972 A | * 5/1972 | Jaffe | 502/84 |
| 4,226,743 A | * 10/1980 | Seese et al. | 502/65 |
| 4,239,651 A | * 12/1980 | Alafandi et al. | 502/64 |
| 4,289,653 A | * 9/1981 | Jaffe | 502/255 |
| 4,499,197 A | 2/1985 | Seese et al. | |
| 4,588,702 A | * 5/1986 | Beck et al. | 502/65 |
| 4,684,530 A | * 8/1987 | Welsh et al. | 426/330.4 |
| 4,711,868 A | 12/1987 | Shyr et al. | |
| 4,758,330 A | * 7/1988 | Kidd | 208/213 |
| 4,988,659 A | * 1/1991 | Pecoraro | 502/235 |
| 5,071,806 A | * 12/1991 | Pecoraro | 502/68 |
| 5,834,572 A | 11/1998 | Derleth et al. | |
| 6,399,530 B1 | * 6/2002 | Chen et al. | 502/64 |
| 2002/0160906 A1 | * 10/2002 | Chen et al. | |

* cited by examiner

Primary Examiner—Steven Bos
(74) Attorney, Agent, or Firm—Steven H. Roth

(57) ABSTRACT

Improved silica-alumina catalyst compositions are methods for preparing such catalyst compositions are disclosed. The present invention relates to a method for preparing a highly homogeneous, amorphous silica-alumina cogel catalyst. Silica-alumina according to the present invention may be prepared by a variety of methods employing batch and continuous processes in different combinations. In one embodiment, a batch process, the present invention provides a method for preparing a highly homogenous silica-alumina cogel catalyst comprising: vigorously mixing an aqueous silicate solution with a gradual addition of an aqueous solution of an acid aluminum salt while maintaining the pH of the solution less than 3.0 and ensuring vigorous and complete mixing of the aluminum salt and silicate solutions to form an acidified silica sol in the aluminum salt solution; gradually adding a basic precipitant to the acidified silica sol/aluminum salt solution while vigorously mixing the solution to raise the pH of the cogel solution to greater than 3.0, producing a cogel; continuing the addition of basic precipitant and vigorous mixing of the cogel solution while maintaining a uniform pH of the cogel solution in the range of from 5–9 until precipitation of the cogel is complete; washing the precipitated cogel; and processing the precipitated cogel into a finished catalyst.

12 Claims, 2 Drawing Sheets

Synthesis of Silica-Alumina

Powder X-Ray Diffraction of Silica-Alumina

US 6,872,685 B2

METHOD FOR PREPARING A HIGHLY HOMOGENEOUS AMORPHOUS SILICA-ALUMINA COMPOSITION

FIELD OF THE INVENTION

This invention relates to improved silica-alumina catalyst compositions and to a method for preparing such catalyst compositions. More specifically, this invention relates to a method for preparing a highly homogeneous, amorphous silica-alumina cogel catalyst, the attributes of which make it especially useful for the hydroprocessing of hydrocarbonaceous feedstocks either alone or in combination with other catalysts.

BACKGROUND OF THE INVENTION

Silica-alumina compounds are well known as catalysts used in hydrocarbon conversion processing. Silica-alumina catalysts such as those made by the method of the present invention can be used "as is", particularly in reactions that require acidic catalysts, or can optionally be combined with zeolites, clays or other binders, and inorganic oxides for the cracking of liquid hydrocarbons in cracking reactors such as fluid catalytic crackers and hydrocrackers. Silica-alumina composites have been used commercially for a variety of hydrocarbon processing applications, such as cracking, desulphurization, demetallation, and denitrification.

Amorphous silica-alumina has been prepared previously by a modified cogel process wherein no hydrogenation metals were added during the gellation step. Spray dried, amorphous silica-alumina catalysts were made by the method as described in U.S. Pat. No. 4,988,659, Pecoraro to produce catalysts used in hydrocarbon conversion processes.

The method of preparation of silica-alumina catalysts affects the chemical and physical properties of the catalysts such as activity (such as cracking or isomerization activity), and physical properties (such as pore structure and volume, surface area, density and catalyst strength). Silica-alumina catalysts such as in the present invention can be used "as is", particularly in reactions that require acidic catalysts, or can optionally be combined with zeolites, clays or other binders, and inorganic oxides for the cracking of liquid hydrocarbons in cracking reactors such as fluid catalytic crackers.

Numerous silica-alumina catalyst compositions and processes for their preparation are described in the patent literature. The patent literature teaches a number of ways to prepare these compositions. U.S. Pat. No. 4,499,197, Seese et al., for example, describes the preparation of inorganic oxide hydrogels, and more particularly, catalytically active amorphous silica-alumina and silica-alumina rare earth cogels. The active cogels are prepared by reacting aluminate and silicate solutions to obtain a silica-alumina pregel, and then reacting the pregel with an acidic rare earth and an aluminum salt solution with complete mixing.

U.S. Pat. No. 4,239,651, Alfandi et al., discloses a process for preparing exchanged ammoniated cogels.

U.S. Pat. No. 4,289,653, Jaffe teaches preparing an extruded catalyst by mixing aluminum sulfate and sulfuric acid with sodium silicate to form a silica sol in an alumina salt solution at pH of 1–3, adding $NH_4OH$ under substantially constant pH of at least 4 to 6; adding more $NH_4OH$ to form a cogelled mass to pH 7.5–8.5; washing cogelled mass; mulling the mass with peptizing agent, a Group VI-B metal compound and a Group VIII metal compound to form extrudable dough; extruding; and drying and calcining.

U.S. Pat. No. 4,988,659, Pecoraro teaches a cogelled, silica-alumina matrix prepared by the method which comprises mixing a silicate solution with an aqueous solution of an acid aluminum salt and an acid, to form an acidified silica sol in the aluminum salt solution, and adjusting the silica sol/aluminum salt solution mixture to a pH in the range of about 1 to 4; slowly adding sufficient base with vigorous stirring, to the acidified silica sol/aluminum salt solution mixture to form a cogel slurry of silica and alumina, and to adjust the slurry to a pH in the range of about 5 to 9; aging the cogel slurry at a temperature of ambient to 203° F.; adjusting the pH of the cogel slurry to about 5–9; recovering a cogelled mass from the slurry; washing the cogelled mass; adjusting the pH of the cogelled mass to between about 4 and 7, and controlling conditions to induce syneresis; and forming the combination into particles.

SUMMARY OF THE INVENTION

This invention relates to a method for making a highly homogeneous amorphous silica-alumina catalyst. Silica-alumina produced by the method of this invention have a Surface to Bulk Si/Al ratio (SB ratio) of from about 0.7 to about 1.3, preferably from about 0.8 to about 1.2, more preferably from about 0.9 to about 1.1, and most preferably 1.0 and a crystalline alumina phase present in an amount no more than about 10%, preferably no more than about 5%. A catalyst made according to the present invention exhibits higher activity and higher liquid product selectivity in comparison with other silica-alumina catalysts.

A NiW catalyst prepared with one of the silica-alumina compositions made according to this invention exhibited superior heavy distillate selectivity relative to a comparable catalyst in a hydrocracking application. The catalyst made according to this invention also exhibits lower gas and naphtha makes, and comparable light distillate make compared to reference silica-alumina catalysts.

DETAILED DESCRIPTION

Figure 1:
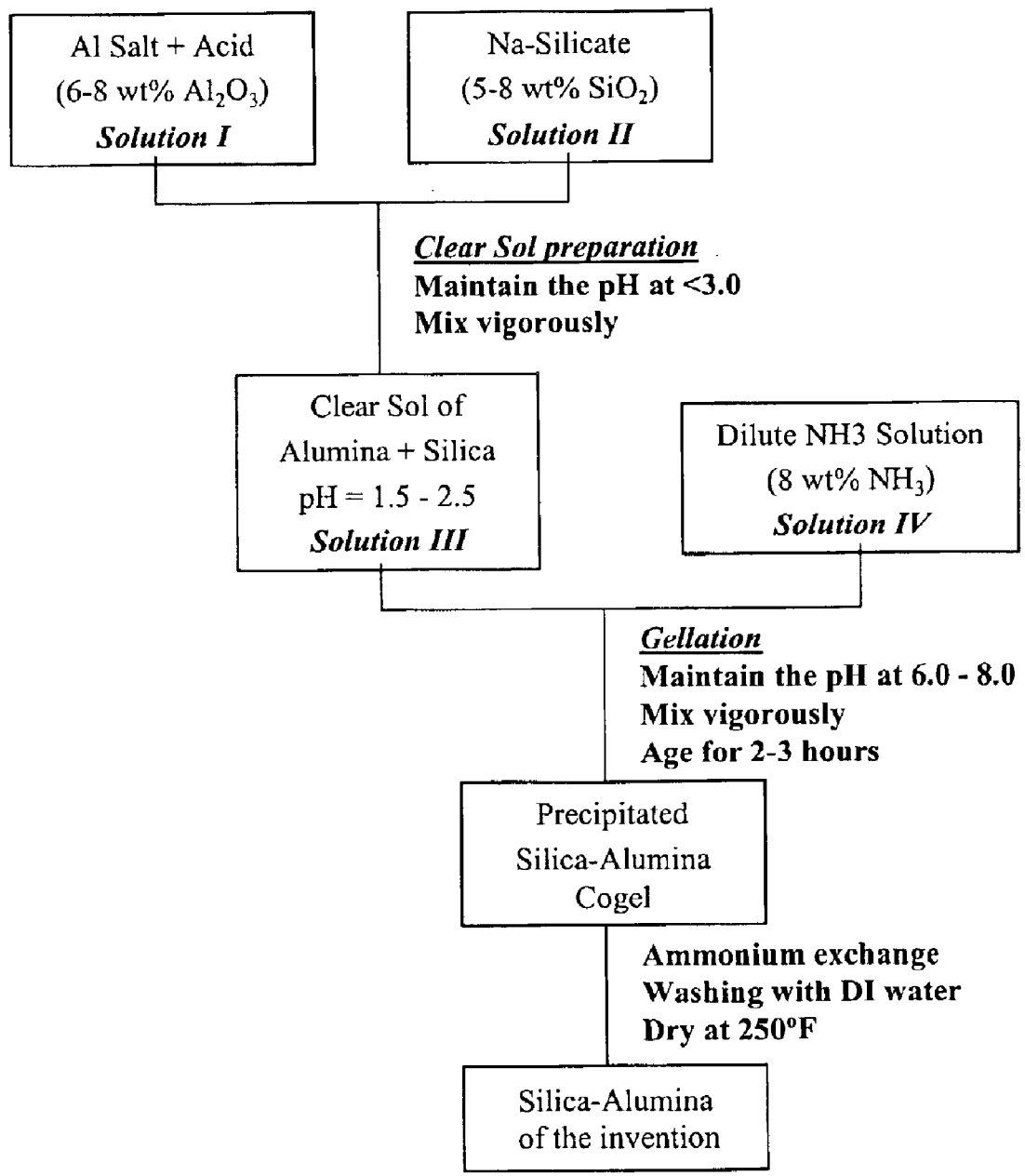
FIG. 1 is a Flow diagram of the general procedure for preparing a silica-alumina composition according to the invention.

The silica-alumina composition of the present invention is highly homogeneous. A "Surface to Bulk Si/Al Ratio" (SB Ratio) has been selected as the measure used to define the homogeneity characteristic of the silica-alumina of the present invention and to compare it with other silica-alumina compositions.

$$SB\ Ratio = \frac{(Si/Al\ atomic\ ratio\ of\ the\ surface\ measured\ by\ XPS)}{(Si/Al\ atomic\ ratio\ of\ the\ bulk\ measured\ by\ elemental\ analysis)}$$

To determine the SB ratio, the Si/Al atomic ratio of the silica-alumina surface is measured using x-ray photoelectron spectroscopy (XPS). XPS is also known as electron spectroscopy for chemical analysis (ESCA). Since the penetration depth of XPS is less than 50 Å, the Si/Al atomic ratio measured by XPS is for the surface chemical composition. Use of XPS for silica-alumina characterization was published by W. Daneiell et al. in Applied Catalysis A, 196, 2000, pp 247–260. The XPS technique is, therefore, effective in measuring the chemical composition of the outer layer of catalytic particle surface. Other surface measurement techniques, such as Auger electron spectroscopy (AES) and Secondary ion mass spectroscopy (SIMS), could also be used for measurement of the surface composition.

Separately, the bulk Si/Al ratio of the composition is determined from ICP elemental analysis. Then, by comparing the surface Si/Al ratio to the bulk Si/Al ratio, the SB ratio and the homogeneity of silica-alumina are determined. How the SB ratio defines the homogeneity of a particle is explained as follows. An SB ratio of 1.0 means the material is completely homogeneous throughout the particles. An SB ratio of less than 1.0 means the particle surface is enriched with aluminum (or depleted with silicon), and aluminum is predominantly located on the external surface of the particles. The SB ratio of more than 1.0 means the particle surface is enriched with silicon (or depleted with aluminum), and aluminum is predominantly located on the internal area of the particles.

A silica-alumina composition is highly homogeneous and is a composition of the present invention when its Surface to Bulk ratio (SB ratio), i.e., the ratio of the Si/Al atomic ratio of the composition measured by XPS at the surface and the Si/Al atomic ratio of the bulk measured by elemental analysis is from about 0.7 to about 1.3, preferably from about 0.8 to about 1.2, more preferably from about 0.9 to about 1.1, and most preferably 1.0.

The SB ratio of reference silica-alumina samples from two commercial sources (Siral-40 from SasolCondea and MS-25 from W. R. Grace) was measured and the following values were obtained:

SB ratio of Siral-40 silica-alumina=2.1–2.8
SB ratio of MS-25 silica-alumina=0.2–0.6

The above results indicate that Siral type of silica-alumina is enriched with silicon on the surface of the particles (i.e., depleted with Al) as published earlier by W. Daneiell et al. in Applied Catalysis A, 196, 2000, pp 247–260. On the other hand, MS-25 silica-alumina is enriched with aluminum on the surface of the particles. The silica-alumina in accordance with the present invention has an SB ratio of from about 0.7 to about 1.3 and is highly homogeneous in that the aluminum is distributed essentially uniformly throughout the particles. To maximize the activity of the silica-alumina, it is most preferable to have a highly homogeneous silica-alumina having an SB ratio of about 1.0.

In addition to being highly homogeneous, the silica-alumina compositions of the present invention are amorphous, wherein a crystalline alumina phase, such as pseudoboehmite alumina phase, is present in an amount no greater than about 10%, preferably no greater than about 5%.

If the aluminum atoms are distributed uniformly throughout the particles, then no separate phase of alumina would be present in the sample. Based on the above hypothesis, the amount of crystalline alumina phase present in silica-alumina samples was measured using an external reference of a pseudoboehmite sample (relative peak area measurement similar to ASTM method D3906) and the results are reported in Table 1. The percent alumina phase was determined by comparing the absolute intensity of an alumina peak at 14 or 38 degree 2θ.

Figure 2:
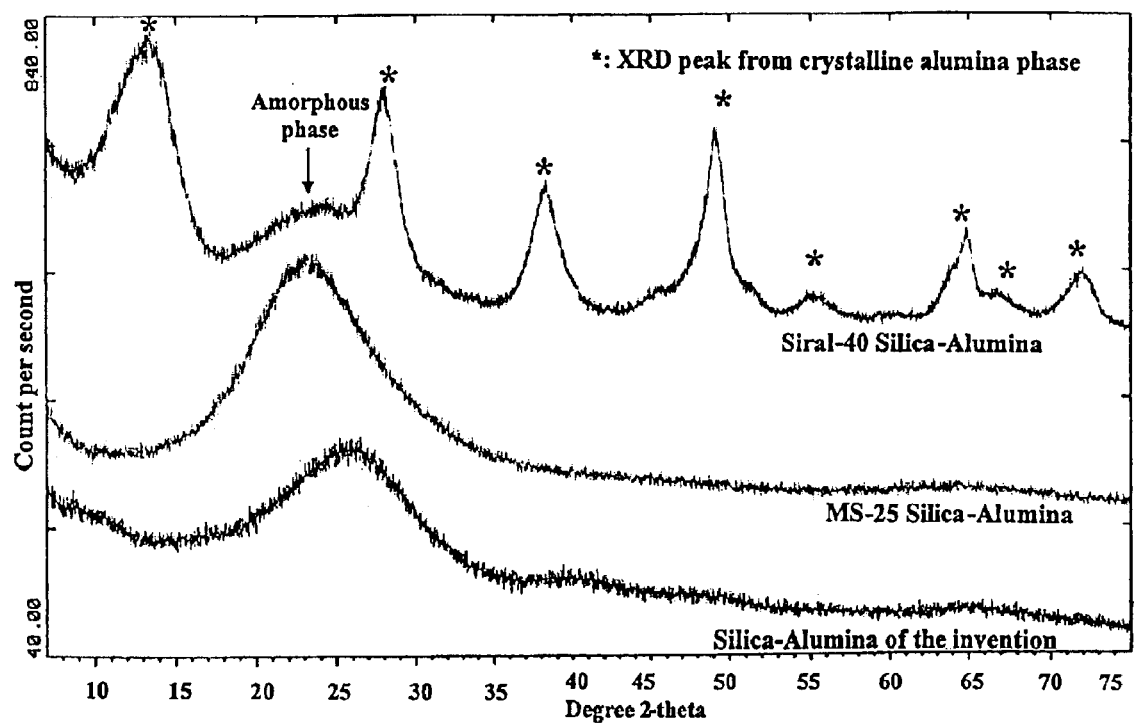
FIG. 2 is a Powder X-Ray Diffraction of various silica-alumina compositions.

Powder X-ray diffraction (XRD) spectrum of silica-alumina of the invention is compared with that of Siral-40 silica-alumina obtained from SasolCondea and shown in FIG. 2. Siral-40 silica-alumina shows a significant amount of crystalline pseudoboehmite alumina phase. Quantitation of the 14 and 38 degree 2θ peaks indicated that Siral-40 contains approximately 48 wt % of crystalline alumina phase. MS-25 silica-alumina does not exhibit crystalline alumina phase in the powder X-ray diffraction. It is not highly homogeneous, however. One possible reason that the MS-25 silica-alumina does not exhibit crystalline alumina phase in the powder X-ray diffraction is that the low loading of aluminum in the MS-25 silica-alumina (2.7 Si/Al atomic ratio) allowed the aluminum to distribute uniformly on the surface. In addition to being highly amorphous, silica-alumina according to the invention does not exhibit distinct crystalline alumina peaks. An integration of the powder X-ray diffraction spectrum in the area of 14 degree 2θ region corresponds to 0% of crystalline phase alumina. This powder X-ray spectrum along with compositional information indicates that the silica-alumina of the present invention is homogeneous throughout the particles and amorphous.

Benefits of using a silica-alumina composition of the invention in hydrocarbon conversion processing are shown by a model compound testing where the catalytic activity was measured using a model feed containing 50 wt % n-Hexane and 50 wt % 3-Methylpentane. The model compound testing was performed at 900° F. The hydrocarbon feed vaporized in helium carrier gas was flown over the 24/40 US mesh pelleted silica-alumina at 0.68 WHSV per g of catalytic material and conversions of the hydrocarbon species were measured using Gas Chromatography. As shown in Table 1, when compared to other reference silica-alumina, the silica-alumina of the present invention showed significantly higher conversion activity. Siral-40 silica-alumina shows 3.9% total conversion, MS-25 silica-alumina 5.1% total conversion while the silica-alumina of the invention shows 8.2% total conversion, which corresponds to 60–110% increase in activity.

Quantitation of the acid site using temperature programmed desorption of a base such as $NH_3$ or isopropylamine cannot differentiate desirable silica-alumina composition from the conventional silica-alumina samples. We performed temperature programmed amine desorption (TPAD) of isopropylamine (IPA) adsorbed in dehydrated silica-alumina samples per procedures published in J. Catalysis 114, 34,1998. The results reported in Table 1 indicate that all three silica-alumina show about 0.4 mmol/g acid site concentrations, and the desorbed IPA content does not correlate with the above model compound testing data.

The percentages of silica and alumina in the composition overall can vary widely. The composition of the silica-alumina can be changed easily to provide a wide range of aluminum content from about 10 to about 90 wt % $Al_2O_3$ in the bulk. The preferred range of aluminum content is from about 30 to about 70 wt % $Al_2O_3$ in the bulk and is most preferably about 46 wt % $Al_2O_3$ in the bulk composition which corresponds to a 1.0 Si/Al atomic ratio in the gel composition so as to maximize the activity of the final silica-alumina catalyst.

Silica-alumina according to the present invention may be prepared by a variety of methods employing batch and continuous processes in different combinations. In one embodiment, a batch process, the present invention provides a method for preparing a highly homogeneous silica-alumina cogel catalyst comprising: vigorously mixing an aqueous solution of an acid aluminum salt with a gradual addition of an aqueous silicate solution while maintaining the pH of the mixed solution less than 3.0 and ensuring vigorous and complete mixing of the aluminum salt and silicate solutions to form an acidified silica sol in the aluminum salt solution; gradually adding a basic precipitant to the acidified silica sol/aluminum salt solution while vigorously mixing the solution to raise the pH of the solution to greater than 3.0, producing a cogel slurry; continuing the addition of basic precipitant to a final pH in the range of from 5–9 to complete the gellation while vigorously mixing the cogel slurry to maintain the uniformity of the slurry mixture during the precipitant addition step; washing the precipitated cogel; and processing the precipitated cogel into a finished catalyst.

In another embodiment, continuous sol formation and continuous gellation, the present invention provides a continuous process for preparing a highly homogeneous silica-alumina cogel catalyst comprising: providing a first aqueous silicate solution; providing a second aqueous solution of an acid aluminum salt; providing a third aqueous solution of a basic precipitant; continuously contacting and vigorously mixing the first and second aqueous solutions in a first mixing zone while maintaining a pH of less than 3.0; removing, preferably continuously, a first mixture from the first mixing zone; continuously contacting and vigorously mixing the first mixture and the third aqueous solution in a second mixing zone while maintaining a uniform pH of from about 5 to 9 to produce a precipitated cogel; removing, preferably continuously, the precipitated cogel from the second mixing zone; washing the precipitated cogel; and processing the precipitated cogel into a finished catalyst.

In another embodiment, batch sol formation and continuous gellation, the present invention provides a continuous gellation method for preparing a highly homogeneous silica-alumina cogel catalyst comprising: vigorously mixing an aqueous solution of an acid aluminum salt with a gradual addition of a silicate solution in a first mixing zone to form an acidified silica sol in the aluminum salt solution while maintaining the pH of the solution less than 3.0 and ensuring vigorous and complete mixing of the aluminum salt and silicate solutions in the first mixing zone to form a first mixture; providing a third aqueous solution of a basic precipitant; continuously contacting and vigorously mixing the first mixture and the third aqueous solution in a second mixing zone while maintaining a uniform pH of from about 5 to 9 to produce a precipitated cogel; continuously removing the precipitated cogel from the second mixing zone; washing the precipitated cogel; and processing the precipitated cogel into a finished catalyst.

The present invention also includes a silica-alumina composition prepared by the methods described herein.

The first two, and most important, steps in the preparation of a silica-alumina cogel are (1) preparation of the clear sol containing silica and alumina and (2) gellation of the sol using a base solution. See U.S. Pat. No. 4,289,653, Jaffe and U.S. Pat. No. 4,988,659, Pecoraro, both of which are incorporated by reference herein.

The starting materials for the sol preparation step include an aluminum salt, acid, and a silica source. The aluminum salt sources that can be used for the synthesis include, but are not limited to aluminum sulfate, aluminum nitrate, aluminum chloride, aluminum bromide, aluminum iodide, aluminum acetate and aluminum metal or alumina dissolved in acid. Useful acid sources include, but are not limited to, acetic acid, formic acid, sulfuric acid, hydrochloric acid, and nitric acid. The silicate sources include, but are not limited to, sodium silicate, precipitated silica dissolved in a base, and colloidal silica.

As previously noted, sol preparation can be done either via a batch process or a continuous process. In either case, it is critical to maintain the pH less than 3.0, and preferably less than 2.5, and to ensure vigorous and complete mixing of the aqueous aluminum salt and silicate solutions to minimize any unwanted gel or particle formation.

A basic precipitant such as ammonium hydroxide is then added to the acidified sol solution. The addition of the precipitant raises the pH of the sol above 3, resulting in cogelling the silica and alumina species. Dilute ammonia solution is the preferred basic precipitant for the gellation. Other bases such as NaOH, $NaAlO_2$, KOH or organic amine derivatives can also be used for the gellation. It is preferred to use an inorganic base for cost reasons.

The gellation step can be done either via batch process or continuous process. In either case, the gellation pH must be uniformly maintained, i.e., held constant in the range of 5–9, preferably 6–8, and most preferably 6.5–7.5. It is critical to have complete, vigorous mixing of the Si—Al solution with the basic precipitant, and to maintain uniform pH throughout the mixture during the precipitant addition step in order to minimize formation of isolated silica domains and alumina domains.

The precipitated cogel is washed to remove any unreacted silicate and aluminum salt, and then it is ammonium exchanged to remove sodium. The cogel is aged for approximately 2–5 hours at room temperature or at an elevated temperature of up to about 90° C. and the aged cogel may be spray-dried for convenience in handling and storage, or may be further processed to the final catalyst from the moist state.

If desired, the material may be extruded, dried and calcined to produce a silica-alumina catalyst or catalyst support. The preferred method of drying and calcining includes an initial drying step in an air-purged oven at 65–175° C. and a final calcination at 480–650° C. for 0.5–5 hours in a furnace or kiln. These and other methods of finishing the material are set forth in U.S. Pat. No. 4,289,653, Jaffe, incorporated by reference herein. The above methods are set forth as examples of how the silica-alumina cogel produced by the present method may be processed into a finished catalyst and are not intended as limitations on the present invention. Other methods of processing the cogel into a finished catalyst are known in the art and are contemplated for use in the present process.

Other components can be combined with the cogel, for example zeolites (large, intermediate, and/or small pore), other sieves such as Beta, SAPO's, AlPO's etc., clays, modified clays, inorganic oxides, and oxide precursors, metals, carbon, organic substances, etc. In addition, other metals may be used to exchange residual $Na_2O$. In these compositions the cogels have been found to be excellent matrices for FCC applications, as well as excellent supports for hydroprocessing applications. The following Examples are illustrative of the present invention, but are not intended to limit the invention in any way beyond what is contained in the claims which follow.

EXAMPLE 1

Synthesis of Silica-Alumina of the Invention by Batch Gellation

An acidic aluminum solution (Solution I containing 7.3 wt % $Al_2O_3$) was prepared by dissolving 1089 g of $AlCl_3.6H_2O$ and 205 g of acetic acid (99.9% concentrated) in 1857 g of deionized water. A dilute solution of sodium silicate (Solution II containing 5 wt % $SiO_2$) was prepared by diluting 931 g of concentrated sodium silicate solution (contains 29 wt % $SiO_2$ and 9% $Na_2O$) with deionized water. The silicate solution was gradually added to the aluminum solution while vigorously mixing to prepare Solution II. It is desirable to maintain the pH below 3.0 to ensure formation of clear sol of silica and alumina. The final pH of the Solution III was 2.2, and the mixing produced a clear silica and alumina solution. The final Solution III contained $SiO_2/Al_2O_3$ molar ratio of 2.0

$H^+/Na^+$ molar ratio of 1.1

Diluted ammonia solution (Solution IV containing 8 wt % $NH_3$) was prepared for gellation. The diluted ammonia solution was added gradually to Solution III containing silica and alumina sol while vigorously mixing. Cogelled silica-alumina started to precipitate when the pH of the slurry reached at about 3.2, and then gellation completed when the pH reached at about 7. We continued the ammonia solution addition until the pH of the slurry reached 8.0. The gel slurry was aged at room temperature for 3 hours while stirring. This cogelled silica-alumina was filtered to produce a filtered cake. The cake was washed with a hot solution of ammonium acetate (3.8 wt %, 10 L solution, 125° F.) for 15 minutes, and then rinsed with 10 L of deionized water. The washing step was repeated four more times. The final cake was dried at 250° F. overnight. A small amount of the dried silica-alumina cake was crushed to small pieces and calcined under excess dry air at 1000° F. for 1 hour for activation. Physical properties of the final silica-alumina are summarized in Table 1.

TABLE 1

Physical Properties and Conversion
Activity of Silica-Alumina Compositions

| | Silica-Alumina Invention (Example 1) | Reference, Siral-40 Silica-Alumina | Reference, MS-25 Silica-Alumina |
|---|---|---|---|
| Surface area, m²/g (a) | 362 | 513 | 486 |
| Total pore volume, cc/g (b) | 0.51 | 0.83 | 0.80 |
| Pore size distribution by $N_2$ Adsorption (b) | | | |
| 30 Å–, % | 8.6 | 7.9 | 5.9 |
| 30–60 Å, % | 55.5 | 30.5 | 45.0 |
| 60–100 Å, % | 32.9 | 32.8 | 39.9 |
| 100–200 Å, % | 1.4 | 18.6 | 8.3 |
| 200–300 Å+, % | 0.4 | 4.2 | 0.4 |
| 300 Å+, % | 1.2 | 5.9 | 0.5 |
| Mean Pore Diameter, Å | 69 | 113 | 75 |
| Na, wt % | <0.05 | <0.05 | <0.05 |
| Surface Si/Al atomic ratio, by XPS | 0.98 | 1.17 | 1.31 |
| Bulk Si/Al atomic ratio, by elemental anal. | 1.03 | 0.57 | 2.74 |
| Surface to Bulk Si/Al Ratio | 0.95 | 2.05 | 0.48 |
| % crystalline alumina phase, by XRD | 0% | 48% | 0% |
| $nC_6$ + $iC_6$ Model Compound Testing (b) | | | |
| Total conversion, wt % | 8.2 | 3.9 | 5.1 |
| $nC_6$ conversion, wt % | 1.0 | 0.8 | 0.9 |
| $iC_6$ conversion, wt % | 15.4 | 7.1 | 9.4 |
| Isopropylamine TPAD, mmol/g | 0.43 | 0.35 | 0.49 |

(a) BET measurements after activation at 1000° F. for 1 hour.
(b) determined after activation at 1000° F. for 1 hour.

EXAMPLE 2

Synthesis of Silica-Alumina of the Invention by Continuous Gellation

An acidic aluminum solution (Solution I containing 6 wt % $Al_2O_3$) was prepared by dissolving 3127 g of $Al_2(SO_4)_3\cdot16H_2O$ and 338 g of sulfuric acid (98% concentrated) in 4968 g of deionized water. A dilute solution of sodium silicate (Solution II containing 6 wt % $SiO_2$) was prepared by diluting 2070 g of concentrated sodium silicate solution (contains 29 wt % $SiO_2$ and 9% $Na_2O$) with deionized water. The silicate solution was gradually added to the aluminum solution while vigorously mixing to prepare Solution III. The final pH of the Solution III was 2.1, and the mixing produced a clear silica and alumina solution. The final Solution III contained $SiO_2/Al_2O_3$ molar ratio of 2.0

$H^+/Na^+$ molar ratio of 1.2

Diluted ammonia solution (containing 8 wt % $NH_3$) was prepared for gellation. The dilute ammonia solution and the Solution III containing the silica and alumina sol were pumped separately and simultaneously into the mixing chamber of an in-line blender. Mixing in the in-line blender was vigorous with 1600 RPM blender-blade rotation. The volume of the mixing chamber is smaller than the total volume of solutions pumped in 1 minute (i.e., less than 1 minute residence time per volume). The addition rate of the ammonia solution was adjusted to maintain the pH of the gel product at 7±0.5. The gel slurry was collected and then aged at room temperature for 2 hours while stirring. This cogelled silica-alumina was filtered to produce a filtered cake. The cake was washed with a hot solution of ammonium sulfate (5 wt %, 10 L solution) for 15 minutes, and then rinsed with 10 L of deionized water. The washing step was repeated four more times. The final cake was dried at 250° F. overnight. A small amount of the silica-alumina was crushed to small pieces and calcined under excess dry air at 1000° F. for 1 hour for activation. Physical properties of the final silica-alumina are summarized in Table 2.

EXAMPLE 3

Synthesis of Silica-Alumina of the Invention by Continuous Sol Preparation Followed by Continuous Gel Preparation This silica-alumina was identical in composition to that prepared in Example 2, but the preparation procedure was different. In this example, the in-line blender from Example 2 was used to prepare Solution II, a clear solution containing silica and alumina sol, as well as the final continuous gellation.

The alumina/sulfuric acid solution (Solution I) and the silicate solution (Solution II) were pumped separately and simultaneously into the mixing chamber of an in-line blender while vigorously mixing. Mixing in the in-line blender was vigorous with 1600 RPM blender-blade rotation. The pH of the combined solution ranged 1.9–2.0. Then the product from the in-line blender (Solution III containing the silica and alumina sol) and the dilute ammonia solution were pumped separately and simultaneously into the mixing chamber of a second in-line blender for gel formation. The rate of the ammonia solution was adjusted to maintain the pH of the gel product at 7±0.5. The mixing in the in-line blender was again vigorous with 1600 RPM blender-blade rotation. The gel product was collected and then aged at room temperature for 2 hours while stirring. This cogelled silica-alumina was filtered to produce a filtered cake. The cake was washed with a hot solution of ammonium sulfate (5 wt %, 10 L solution) for 15 minutes, and then rinsed with 10 L of deionized water. The washing step was repeated four more times. The final cake was dried at 250° F. overnight. A small amount of the silica-alumina was sized to small pieces and calcined under excess dry air at 1000° F. for 1 hour for activation. Physical properties of the final silica-alumina are summarized in Table 2.

TABLE 2

Physical Properties and Conversion Activity of a Silica-Alumina of the Invention Prepared by a Continuous Process

| | Silica-Alumina Invention | |
|---|---|---|
| | (Example 2) | (Example 3) |
| Surface area, m²/g (a) | 418 | 367 |
| Total pore volume, cc/g (b) | 0.55 | 0.77 |
| Pore size distribution by N₂ Adsorption (b) | | |
| 30 Å-, % | 11.4 | 8.2 |
| 30–60 Å, % | 54.7 | 22.9 |
| 60–100 Å, % | 25.2 | 17.2 |
| 100–200 Å, % | 6.3 | 23.3 |
| 200–300 Å+, % | 1.0 | 11.1 |
| 300 Å+, % | 1.4 | 17.3 |
| Mean Pore Diameter, Å | 71 | 187 |
| Na, wt % | <0.05 | <0.05 |
| Surface Si/Al atomic ratio, by XPS | 1.07 | 1.21 |
| Bulk Si/Al atomic ratio, by elemental anal. | 1.03 | 0.96 |
| Surface to Bulk Si/Al Ratio | 1.04 | 1.26 |
| % crystalline alumina phase, by XRD | 0% | 5% |
| nC₆ + iC₆ Model Compound Testing | | |
| Total conversion, wt % | 11.3 | 8.6 |
| nC₆ conversion, wt % | 1.3 | 1.2 |
| iC₆ conversion, wt % | 21.3 | 16 |

The continuous preparations of Example 2 and Example 3 produced high quality silica-alumina with uniform composition. They exhibited high surface areas of 418 and 367 m²/g. The continuous gellation prep (Example 2) produced a composition with the pore size distribution nearly identical to the sample produced via batch gellation (Example 1). The continuous sol/continuous gel preparation produced a silica-alumina of the invention with much larger pores (Example 3). The mean pore diameter is 187 Å for silica alumina made by the continuous sol/continuous gel preparation, and 69 and 71 Å for silica-alumina prepared by the batch gellation and continuous gellation, respectively. All silica-alumina samples showed excellent activity for hydrocarbon conversion as shown with the model compound testing. Example 2 showed 11.3% total hydrocarbon conversion and Example 38.6% conversion, comparable to the sample prepared via batch gellation.

EXAMPLE 4:

(Comparative) Preparation of NiW Hydrocracking Catalyst with Silica-Alumina (Catalyst A—Base-Case)

A base-case hydrocracking catalyst containing Siral-40, the reference silica-alumina from Table 1, was prepared per following procedure. 75 parts silica-alumina powder (Siral-40, obtained from SasolCondea) and 25 parts pseudoboehmite alumina powder (obtained from Vista) were mixed well. To the mix, diluted $HNO_3$ acid and sufficient amount of deionized water were added to form an extrudable paste (3 wt % $HNO_3$ to the total powders). These weights are on 100% solids basis. The paste was extruded in 1/16" cylinder, and dried at 250° F. overnight. The dried extrudates were calcined at 1100° F. for 1 hour with purging excess dry air, and cooled down to room temperature.

Impregnation of Ni and W was done using a solution containing ammonium metatungstate and nickel nitrate to the target metal loadings of 4 wt % NiO and 28 wt % $WO_3$ in the finished catalyst. The total volume of the solution matched the 100% water pore volume of the base extrudate sample (incipient wetness method). The metal solution was added to the base extrudates gradually while tumbling the extrudates. When the solution addition was complete, the soaked extrudates were aged for 2 hours. Then the extrudates were dried at 250° F. overnight. The dried extrudates were calcined at 935° F. for 1 hour with purging excess dry air, and cooled down to room temperature. This catalyst is named Catalyst A and its physical properties are summarized in Table 4.

Catalyst B, a NiW catalyst containing silica-alumina of the invention, was prepared using a procedure similar to Catalyst A. For Catalyst B, 80 parts silica-alumina of the invention from Example 1 and 20 parts pseudoboehmite alumina were used to prepare the base extrudates. The target metal loadings were 4 wt % Ni and 20 wt % W.

Catalyst C, a silica-alumina containing silica-alumina of the invention was prepared using a procedure nearly identical to Catalyst A. For Catalyst C, silica-alumina of the invention from Example 3 was used to prepare the base extrudates. Physical properties of Catalyst B and C are summarized in Table 4.

A petroleum feedstock with the following properties (Table 3) was used to evaluate the catalysts.

TABLE 3

Feedstock Properties

| Properties | |
|---|---|
| API Gravity | 33.7 |
| Sulfur, ppm wt | 7 |
| Nitrogen, ppm wt | 0.7 |
| D2887 Simulated Distillation | |
| IBP | 645° F. |
| 10 wt % | 707° F. |
| 30 wt % | 769° F. |
| 50 wt % | 826° F. |
| 70 wt % | 890° F. |
| 90 wt % | 977° F. |
| End Point | 1079° F. |

Microunit evaluation of catalysts was done in a once-through, down-flow microunit with 6 cc of 24/40 (US) meshed catalyst. Process conditions were approximately 2000 psig reactor pressure, a feed rate of 1.5 hour$^{-1}$ LHSV and once-though $H_2$ flow rate corresponding 5000 SCF of $H_2$/bbl of oil. The catalyst bed temperature was varied to cover 60–80 wt % of conversion of the 700° F.⁺ feed to 700° F.⁻ product. The yields of $C_4^-$ gas, naphtha, and light and heavy distillate components were calculated using D2887 Simdis analysis results. The overall yields and reactor temperature data were interpolated to 70 wt % conversion and summarized in Table 4.

Catalysts of the invention (Catalysts B and C) showed much higher activity than the base case catalyst made with a commercial silica-alumina (Catalyst A). A catalyst of the invention achieved the same conversion at 23–24° F. lower reactor temperatures (Table 4). In addition, the product selectivity is also favored by catalysts of invention in that about 1 wt % advantage in the distillate yield was observed. Such high activity advantage and at the same time better distillate selectivity are quite unexpected benefits of silica-alumina of the present invention.

TABLE 4

Catalyst Properties and Performance

|  | Catalyst A Non-Invention | Catalyst B Invention | Catalyst C Invention |
|---|---|---|---|
| Composition (before metals addition) | | | |
| Silica-Alumina | 75% Siral-40 | 80% silica-alumina (Example 1) | 75% silica-alumina (Example 3) |
| $Al_2O_3$ Binder | 25% Catapal B | 20% Catapal B | 25% Catapal B |
| Properties after Metals Addition | | | |
| Ni, wt % | 3.2 | 3.9 | 3.3 |
| W, wt % | 21.4 | 18.7 | 21.6 |
| Surface area, $m^2/g$ | 229 | 182 | 166 |
| Catalyst Performance in Single-Pass Micro Unit | | | |
| Activity, °F., for 70% Conversion | 741 | 717 | 718 |
| Yields @ 70% Conv., wt % | | | |
| $C_4^-$ Gas | 3.3 | 2.9 | 2.8 |
| Naphtha (C5–250° F.) | 13.1 | 12.8 | 12.8 |
| Light Distillate (250–550° F.) | 36.4 | 37.2 | 37.4 |
| Heavy Distillate (550–700° F.) | 21.3 | 21.1 | 21.0 |
| Total Distillate (250–700° F.) | 57.7 | 58.3 | 58.5 |

While not wanting to be bound by any specific theory, the performance advantage of the catalyst of the invention appears to come from maximizing the number of the available acid sites in the silica-alumina composition. This was achieved by having a highly homogeneous distribution of aluminum throughout the silica-alumina particles. As a result, the silica-alumina of the present invention exhibits much higher activity than conventional silica-alumina. Typically, higher activity is connected to poorer selectivity for distillate. Surprisingly, on the contrary catalysts of the present invention exhibit the additional benefit of improved distillate yield, indicating enhanced isomerization activity.

There are numerous variations on the present invention which are possible in light of the teachings and supporting examples described herein. It is therefore understood that within the scope of the following claims, the invention may be practiced otherwise than as specifically described or exemplified herein.

What is claimed is:

1. Method for preparing a highly homogeneous amorphous silica-alumina cogel catalyst comprising:
    vigorously mixing an aqueous silicate solution with an aqueous solution of an acid aluminum salt while maintaining the pH of the mixed solution less than 3.0 and ensuring vigorous and complete mixing of the aluminum salt and silicate solutions to form an acidified silica sol in the aluminum salt solution;
    gradually adding a basic precipitant to said acidified silica sol in the aluminum salt solution while vigorously mixing the solution to raise the pH of the solution to greater than 3.0, producing a cogel slurry;
    continuing the addition of basic precipitant to a final PH in the range of 5–9 while vigorously mixing the cogel slurry to maintain a uniform pH throughout the cogel slurry
    washing the precipitated cogel; and
    processing the precipitated cogel into a finished catalyst.

2. A method according to claim 1, wherein the final pH of the cogel slurry is maintained at a uniform pH of about 6–8.

3. A method according to claim 1, wherein the final pH of the cogel slurry is maintained at a uniform pH of about 6.5–7.5.

4. A catalyst composition comprising a, silica-alumina cogel catalyst prepared by the method of claim 1 and having a Surface to Bulk Si/Al ratio of fmm 0.9 to 1.1 and a crystalline alumina phase present in an amount no more than about 5%.

5. A continuous process for preparing a highly homogeneous, amorphous silioa-alumina cogel catalyst comprising:
    providing a first aqueous silicate solution;
    providing a second aqueous solution of an acid aluminum salt;
    providing a third aqueous solution of a basic precipitant;
    continuously contacting and vigorously mixing the first and second aqueous solutions in a first mixing zone while maintaining a pH of less than 3.0;
    removing a first mixture from the first mixing zone continuously;
    contacting and vigorously mixing the first mixture and the third aqueous solution in a second mixing zone while maintaining a uniform pH of from about 5 to 9 to produce a precipitated cogel;
    removing the precipitated cogel from the second mixing zone continuously;
    washing the precipitated cogel; and
    processing the precipitated cogel into a finished catalyst.

6. A process according to claim 5, wherein the pH in the second mixing zone is maintained uniformly from about 6–8.

7. A process according to claim 5, wherein the pH in the second mixing zone is maintained uniformly from about 6.5–7.5.

8. A catalyst composition comprising a, silica-alumina cogel catalyst prepared by the method of claim 5 and having a Surface to Bulk Si/Al ratio of from 0.9 to 1.1 and a crystalline alumina phase present in an amount no more than about 5%.

9. A continuous gellation method for preparing a highly homogeneous silica-alumina cogel catalyst comprising:

vigorously mixing a silicate solution with an aqueous solution of an acid aluminum salt in a first mixing zone to form an acidified silica sol in the aluminum salt solution while maintaining the pH of the mixed solution less than 3.0 and ensuring vigorous and complete mixing of the aluminum salt and silicate solutions in the first mixing zone to form a first mixture;

providing an aqueous solution of a basic precipitant;

continuously contacting and vigorously mixing the first mixture and the basic precipitant in a second mixing zone while maintaining a uniform pH of from about 5 tog to produce a precipitated cogel;

continuously removing the precipitated cogel from the second mixing zone;

washing the precipitated cogel; and processing the precipitated cogel into a finished catalyst.

10. A process according to claim 9, wherein the pH in the second mixing zone is maintained uniformly from about 6–8.

11. A process according to claim 9, wherein the pH in the second mixing zone is maintained uniformly from about 6.5–7.5.

12. A catalyst composition comprising a, silica-alumina cogel catalyst prepared by the method of claim 9 and having a Surface to Bulk Si/Al ratio of from 0.9 to 1.1 and a crystalline alumina phase present in an amount no more than about 5%.

* * * * *